(12) United States Patent
Ulupinar et al.

(10) Patent No.: US 7,061,971 B2
(45) Date of Patent: Jun. 13, 2006

(54) METHOD AND APPARATUS FOR DIVERSITY SEARCHING AND DEMODULATOR ASSIGNMENT IN A WIRELESS COMMUNICATION SYSTEM

(75) Inventors: Fatih Ulupinar, San Diego, CA (US); Senthilkumar K. Sundaram, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 292 days.

(21) Appl. No.: 10/193,925

(22) Filed: Jul. 11, 2002

(65) Prior Publication Data

US 2004/0008757 A1    Jan. 15, 2004

(51) Int. Cl.
    *H04B 1/707*    (2006.01)
    *H04Q 7/20*    (2006.01)
(52) U.S. Cl. .................... 375/148; 375/144; 455/422.1
(58) Field of Classification Search ................ 375/136, 375/144, 147, 148, 347, 349; 370/206, 320, 370/335, 342, 441, 465; 455/132, 137, 272, 455/422.1, 517, 522, 562.1
    See application file for complete search history.

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,109,390 A | | 4/1992 | Gilhousen et al. |
| 5,490,165 A | * | 2/1996 | Blakeney et al. ............ 370/335 |
| 5,889,768 A | * | 3/1999 | Storm et al. ................. 370/320 |
| 5,926,503 A | * | 7/1999 | Kelton et al. ................ 375/148 |
| 6,072,807 A | * | 6/2000 | Daudelin ..................... 370/465 |
| 6,078,611 A | * | 6/2000 | La Rosa et al. ............. 375/147 |
| 6,269,075 B1 | * | 7/2001 | Tran ........................... 370/206 |
| 6,330,456 B1 | * | 12/2001 | Hashem et al. ............. 455/522 |
| 6,333,926 B1 | * | 12/2001 | Van Heeswyk et al. ..... 370/335 |
| 6,345,078 B1 | * | 2/2002 | Basso .......................... 375/349 |
| 6,363,108 B1 | | 3/2002 | Agrawal et al. |
| 6,370,183 B1 | * | 4/2002 | Newson et al. ............. 375/144 |
| 6,456,849 B1 | * | 9/2002 | Purnadi et al. ............. 455/453 |
| 6,515,977 B1 | * | 2/2003 | Bi et al. ...................... 370/342 |
| 6,526,090 B1 | * | 2/2003 | Papasakellariou ........... 375/136 |
| 6,711,420 B1 | * | 3/2004 | Amerga et al. .......... 455/562.1 |
| 6,795,411 B1 | * | 9/2004 | Dino et al. .................. 455/522 |
| 2003/0153311 A1 | * | 8/2003 | Black .......................... 455/436 |

* cited by examiner

*Primary Examiner*—Betsy L. Deppe
(74) *Attorney, Agent, or Firm*—Philip Wadsworth; Sandra L. Godsey; Maryanne E. DeAngelo (57) ABSTRACT

A method and apparatus for diversity searching and demodulator finger assignment in receivers with multiple receive chains enhances reception using optimal search and demodulator finger assignment operations. Optimal search and demodulator finger assignment for diversity environments provides improved interference cancellation and exploitation of independent fading by ensuring cell and receive chain diversity. After performing standard single antenna searching operations for each diversity receive chain, demodulator finger assignments are made according to signal strength and cell diversity. Signal paths are then re-assigned to achieve receive chain diversity if necessary. The availability of power control combiners may be considered when making demodulator finger assignments depending on the architecture of diversity receiver.

13 Claims, 5 Drawing Sheets

METHOD AND APPARATUS FOR DIVERSITY SEARCHING AND DEMODULATOR ASSIGNMENT IN A WIRELESS COMMUNICATION SYSTEM

BACKGROUND

1. Field

The presently disclosed embodiments relate generally to wireless communications, and more specifically to a novel and improved method of diversity searching and demodulator assignment in receivers with multiple receive chains.

2. Background

Wireless communication systems are widely deployed to provide various types of communication such as voice, data, fax, and so on. These systems may be based on code division multiple access (CDMA), time division multiple access (TDMA), or other modulation techniques. A CDMA system provides certain advantages over other types of systems, including increased system capacity.

The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM." Another specific CDMA system is disclosed in U.S. patent application Ser. No. 08/963,386, now U.S. Pat. No. 6,574,211, issued Jun. 3, 2003, entitled "METHOD AND APPARATUS FOR HIGH RATE PACKET DATA TRANSMISSION," (hereinafter, the HDR system). These patents and patent application are assigned to the assignee of the present invention and incorporated herein by reference.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (5) some other standards. These standards are incorporated herein by reference. A system that implements the High Rate Packet Data specification of the cdma2000 standard is referred to herein as a high data rate (HDR) system. The HDR system is documented in TIA/EIA-IS-856, "CDMA2000 High Rate Packet Data Air Interface Specification," and incorporated herein by reference. Proposed wireless systems also provide a combination of HDR and low data rate services (such as voice and fax services) using a single air interface.

CDMA receivers commonly employ RAKE receivers, described in U.S. Pat. No. 5,109,390 entitled "DIVERSITY RECEIVER IN A CDMA CELLULAR TELEPHONE SYSTEM," assigned to the assignee of the present invention and incorporated herein by reference. A rake receiver is typically made up of one or more searchers for locating direct and multi-path pilots from neighboring base stations, and two or more multi-path demodulator fingers for receiving and combining information signals from those base stations. Searchers are described in U.S. patent application Ser. No. 09/892,280, now U.S. Publication No. 2001-0046205, published Nov. 29, 2001, entitled "MULTI-PATH SEARCH PROCESSOR FOR SPREAD SPECTRUM MULTIPLE ACCESS COMMUNICATION SYSTEMS," filed Jun. 26, 2001, and U.S. Pat. No. 6,363,108, entitled "PROGRAMMABLE MATCHED FILTER SEARCHER," issued Mar. 26, 2002, both assigned to the assignee of the present invention and incorporated herein by reference. The rake receiver processes a modulated signal that has been transmitted on the forward or reverse link using the searcher element and finger processors. The searcher element searches for strong instances of the received signal known as multi-paths. The finger processors are assigned to process the strongest multi-paths to generate demodulated symbols for those multi-paths. The rake receiver then combines the demodulated symbols from all assigned finger processors to generate recovered symbols that are estimates of the transmitted data. The rake receiver efficiently combines energy received via multiple signal paths.

Inherent in the design of direct sequence CDMA systems is the requirement that a receiver must align its Pseudorandom Noise (PN) sequences to the pilot PN of the base station. A base station distinguishes itself from other base stations by inserting a unique time offset in the generation of its PN sequences. In IS-95 systems, all base stations are offset by an integer multiple of 64 chips. A subscriber unit communicates with a base station by assigning at least one demodulator finger to that base station. An assigned demodulator finger must insert the appropriate offset into its PN sequence in order to communicate with that base station. It is also possible to differentiate base stations by using unique PN sequences for each base station rather than offsets of the same PN sequence. In this case, a demodulator finger would adjust its PN generator to produce the appropriate PN sequence for the base station to which it is assigned.

To improve the quality of wireless transmissions, communication systems often employ multiple radiating antenna elements at the transmitter, or diversity transmission, to communicate information to a receiver. Multiple antennas are desirable, as wireless communication systems tend to be interference-limited, and the use of multiple antenna elements reduces inter-symbol and co-channel interference introduced during modulation and transmission of radio signals, enhancing the quality of communications. Further, the use of multiple element antenna arrays at both the transmitter and receiver enhances the capacity of multiple-access communication systems. Multi-path signals may be generated at a receiver by diversity transmission or as a result of dispersion of the channel during transmission.

Thus, at a receiving destination, more than one receiver chain may be needed to process the multi-path received signals. A diversity receiver may have multiple antennas. A receiver chain for signals received at each antenna may be necessary. Therefore, multiple receiver chains may be necessary to exploit the multi-path signals received at multiple receive antennas. Receivers equipped with multiple receive chains are able to enhance their reception with improved interference cancellation and capitalization of independent fading of the receive chains, but complexity is created in the searching and assignment of the received multi-paths to the demodulation fingers of the RAKE receiver. Finger limitation becomes an important issue for diversity receivers, as compared to single element receivers, because the number of possible paths produced by each search of each active set element is a multiplied by the number of antenna elements, complicating the task of selecting the best paths for signal combining.

Thus, there is a need in the art for maximizing reception of multi-path signals by emphasizing the diversity of receive chains using optimal search and triage operations for diversity receivers.

SUMMARY

Embodiments disclosed herein address the above-stated need for maximizing reception of multi-path signals by emphasizing the diversity of receive chains using optimal search and demodulator finger assignment operations for diversity receivers.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

Figure 1:
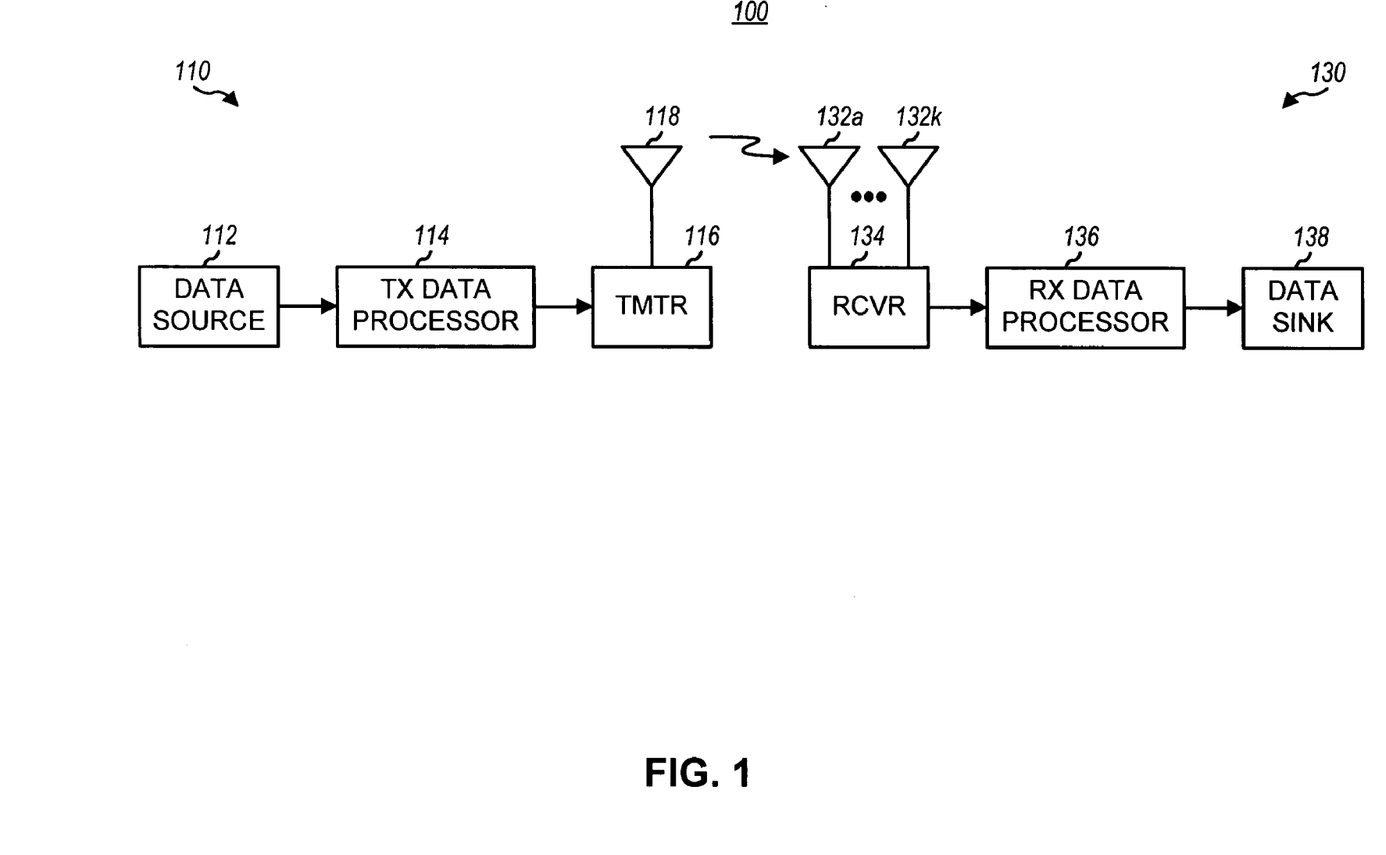
FIG. 1 is a simplified block diagram of an exemplary embodiment of a diversity communication system.

FIG. 1 is a simplified block diagram of an exemplary embodiment of a diversity communication system 100. At a transmitter unit 110, data is sent, typically in packets, from a data source 112 to a transmit (TX) data processor 114 that formats, encodes, and processes the data to generate one or more analog signals. The analog signals are then provided to a transmitter (TMTR) 116 that amplifies, filters, quadrature modulates, and upconverts the received analog signals to generate a modulated signal suitable for transmission via one or more antennas 118 to one or more receivers 130.

Receiver unit 130 may comprise a cellular telephone for mobile subscribers (mobile station), a cordless telephone, a paging device, a wireless local loop device, a personal digital assistant (PDA), an Internet telephony device, a component of a satellite communication system, or any other receiving component of a communications system. At a receiver unit 130, the transmitted signal(s) is received by one or more antennas 132a–132k and provided to a receiver (RCVR) 134. The diversity architecture of receiver unit 130 is detailed in FIG. 2. Within receiver 134, each received signal is amplified, filtered, frequency downconverted, quadrature demodulated, and digitized to provide inphase (I) and quadrature (Q) samples. The samples may be digitally processed and then provided to a receive (RX) data processor 136 that further processes and decodes the samples to recover the transmitted data signals. The processing and decoding at RX data processor 136 are performed in a manner complementary to the processing and encoding performed at TX data processor 114. RX data processor 136 may apply multi-path searching and diversity optimization demodulator finger assignment algorithms detailed in FIG. 3 and FIG. 4, respectively, to the recovered signals. The decoded data is then provided to a data sink 138.

The diversity communication system described above supports transmissions of traffic data, messaging, voice, video, and other types of communication in one direction. A bi-directional communication system supports two-way data transmission. FIG. 1 can represent the forward link processing in a CDMA system, in which case, transmitter unit 110 can represent a base station and receiver unit 130 can represent a mobile station. FIG. 1 may also represent the reverse link processing in a CDMA system, in which case, transmitter unit 110 can represent a mobile station and receiver unit 130 can represent a base station. The disclosed embodiments are equally applicable to modulation techniques other than CDMA.

Figure 2:
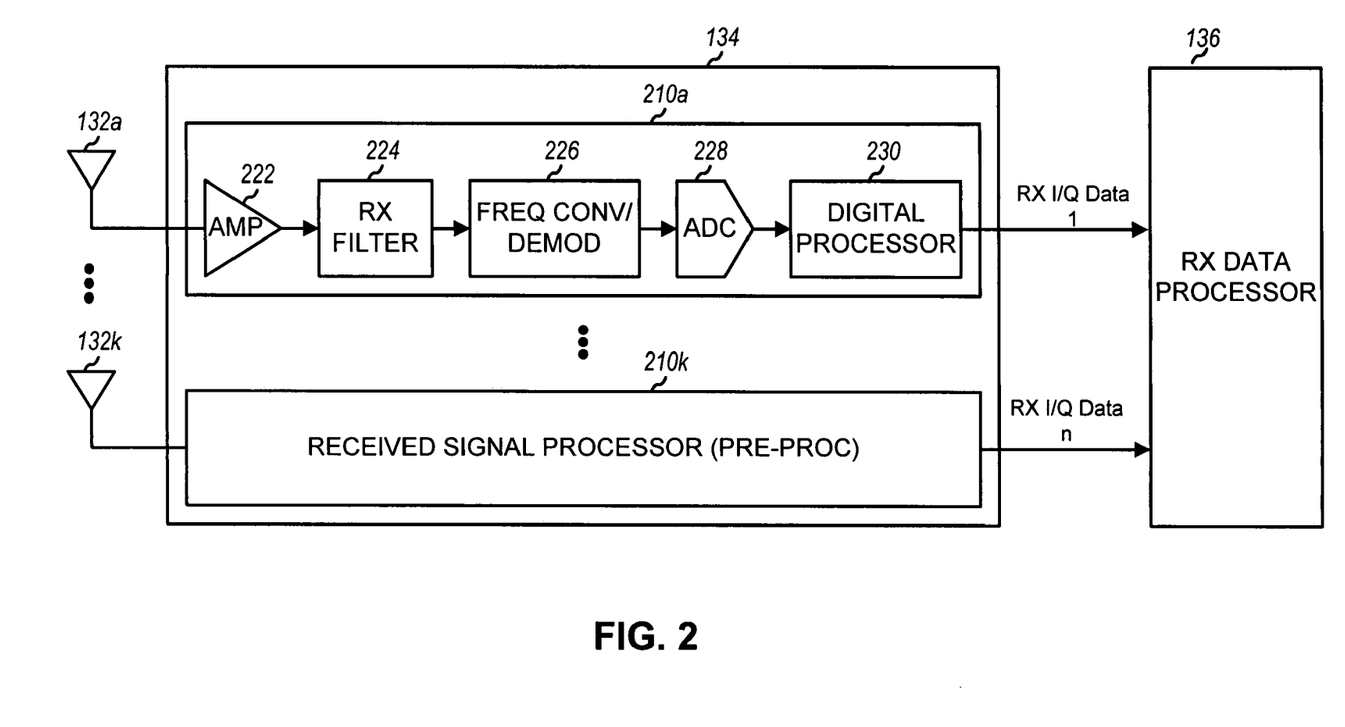
FIG. 2 is a simplified block diagram of an exemplary embodiment of diversity receiver architecture.

FIG. 2 is a block diagram illustrating the architecture of an exemplary embodiment of diversity receiver unit 130. In this embodiment, receiver unit 130 includes a number of antennas 132a through 132k. Each antenna 132 couples to a respective received signal processor (or pre-processor) 210a–210k within receiver 134. Within each pre-processor 210, the received signal from antenna 132 is (low noise) amplified by an amplifier 222, filtered by a receive (RX) filter 224, frequency downconverted and quadrature demodulated by a frequency converter/demodulator 226, and digitized by one or more analog-to-digital converters (ADCs) 228 to provide ADC samples. The ADC samples are further processed by a digital processor 230 to generate complex I and Q samples that are then provided to receive data processor 136 as data streams. An exemplary embodiment of receive data processor 136 has 4 demodulator fingers, for demodulating the signals from two antennas.

As shown in FIG. 2, receiver unit 130 includes a number of antennas 132a through 132k that couple to a number of pre-processors 210a through 210k used to process the signals received via the antennas. Each combination of antenna 132 and pre-processor 210 forms part of a signal path (multi-path) used to process a particular received signal. The use of multiple antennas 132 in receiver unit 130 provides spatial diversity and may further suppress interference from other transmission sources, both of which can improve performance.

FIG. 2 shows an exemplary embodiment of the functional elements that can be used to implement pre-processor 210. Generally, pre-processor 210 can include any combination of the functional elements shown in FIG. 2, and the elements can also be arranged in any order to obtain the desired output. For example, multiple stages of amplifiers and filters are typically provided within pre-processor 210. Moreover, different functional elements than those shown in FIG. 2 may also be included within pre-processor 210 and remain within the scope of the invention.

In a conventional system with one antenna, the single antenna provides multiple paths that are assigned to the available demodulators based simply on signal strengths. For example, the four strongest signal paths would be assigned to four available demodulators. In the exemplary diversity embodiment with 2 antennas and four demodulators, optimal utilization of the signals from the two antennas cannot be obtained by simply assigning the strongest signal paths to the available demodulators. To get the maximum performance in a diversity environment, cell diversity and antenna diversity must be preserved by using the searcher and demodulator resources in an optimal manner for the diversity environment. First, searching is performed to detect the set of possible paths by performing a standard search for a single antenna on each antenna of the diversity receiver. Then, a diversity optimization demodulator finger assignment algorithm, or triage, is applied to the set of possible paths produced by searching the diversity antenna signals. The diversity optimization demodulator finger assignment algorithm maximizes reception of the diversity antenna signals by emphasizing the diversity of the multiple receive chains in assigning paths to demodulator fingers. The novel use of searcher and demodulator resources for diversity optimization is detailed in the following figures.

Figure 3:
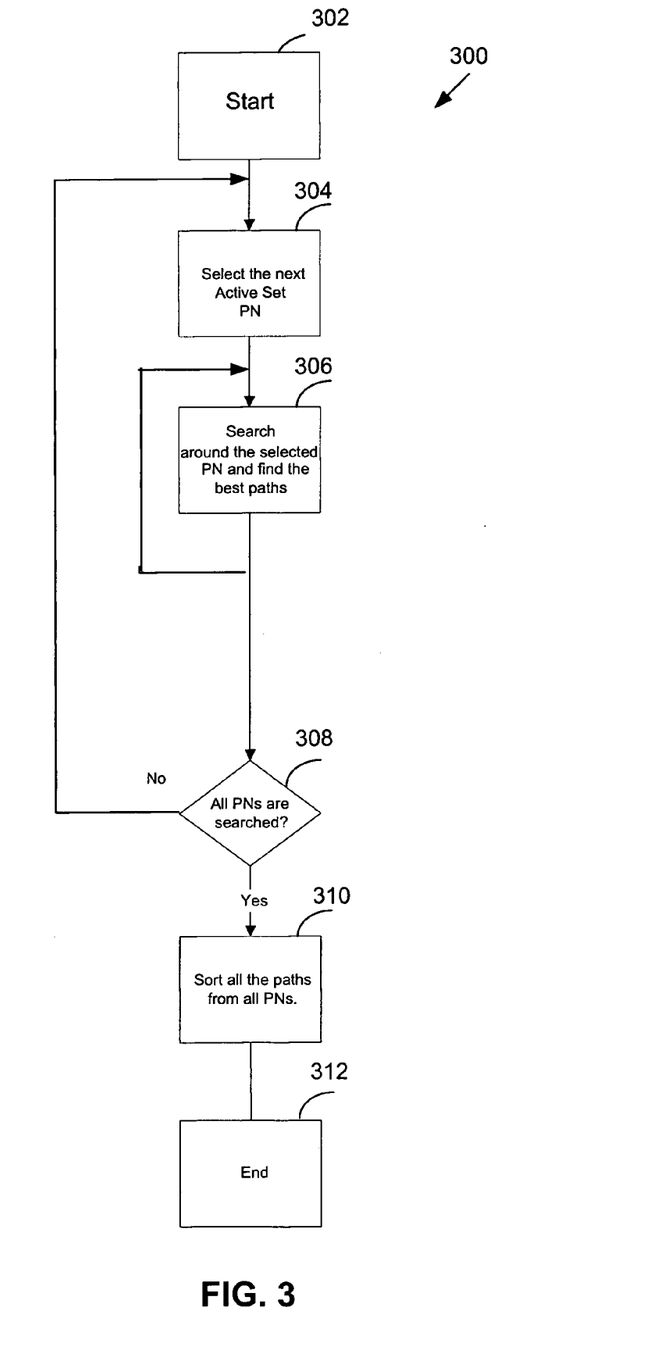
FIG. 3 is a flowchart illustrating steps of multi-path searching in accordance with an exemplary embodiment.

FIG. 3 is a flowchart illustrating steps of multi-path searching in accordance with an exemplary embodiment. One skilled in the art will understand that ordering of steps illustrated in FIG. 3 is not limiting. The method is readily amended by omission or re-ordering of the steps illustrated without departing from the scope of the disclosed embodiments. The searching operation is responsible for finding the best paths for PNs in the active set of a receiver unit. The active set consists of the PNs of cell sectors currently being considered for demodulator finger assignment. The searching operation is performed by measuring the energy, or correlation, in the received signal around the pilot PN of the cell sectors, or elements, in the active set. The searching operation sweeps through all the time offsets around a particular pilot PN and finds the correlation peaks, each peak being a path where a higher peak is a stronger signal.

The searching operation 300 begins at step 302. Control flow proceeds to step 304.

In step 304, the next PN, or element, in the active set is selected for search. Control flow proceeds to step 306.

In step 306, the energy in a predetermined number of time offsets around the PN selected in step 304 is measured for correlation. In an exemplary embodiment, the predetermined number of offsets is four. Step 306 is repeated for each diversity antenna. In an exemplary embodiment, there are 2 antennas. When step 306 has been performed for each antenna, control flow proceeds to step 308.

In step 308, if all of the PN elements in the active set have not been searched, control flow returns to step 304. If all of the PNs have been searched, control flow proceeds to step 310.

In step 310, a predetermined number of the highest correlation peaks for each antenna are selected as possible paths. Control flow proceeds to step 312, ending the process.

When antenna diversity is added to a receiver, the number of possible paths is the number of paths returned by the searching operation for all cells multiplied by the number of antennas. In an exemplary embodiment, a receiving unit having two antennas is in handoff with three cells, and the searching operation returns four paths for each cell, producing 24 possible paths. In another embodiment having 6 elements in the active set, there are 48 possible paths. Thus, the complexity of assigning paths to demodulator fingers is compounded in a diversity system. Diversity optimization triage of assigning the possible paths to the available demodulator fingers is detailed in FIG. 4.

Figure 4:
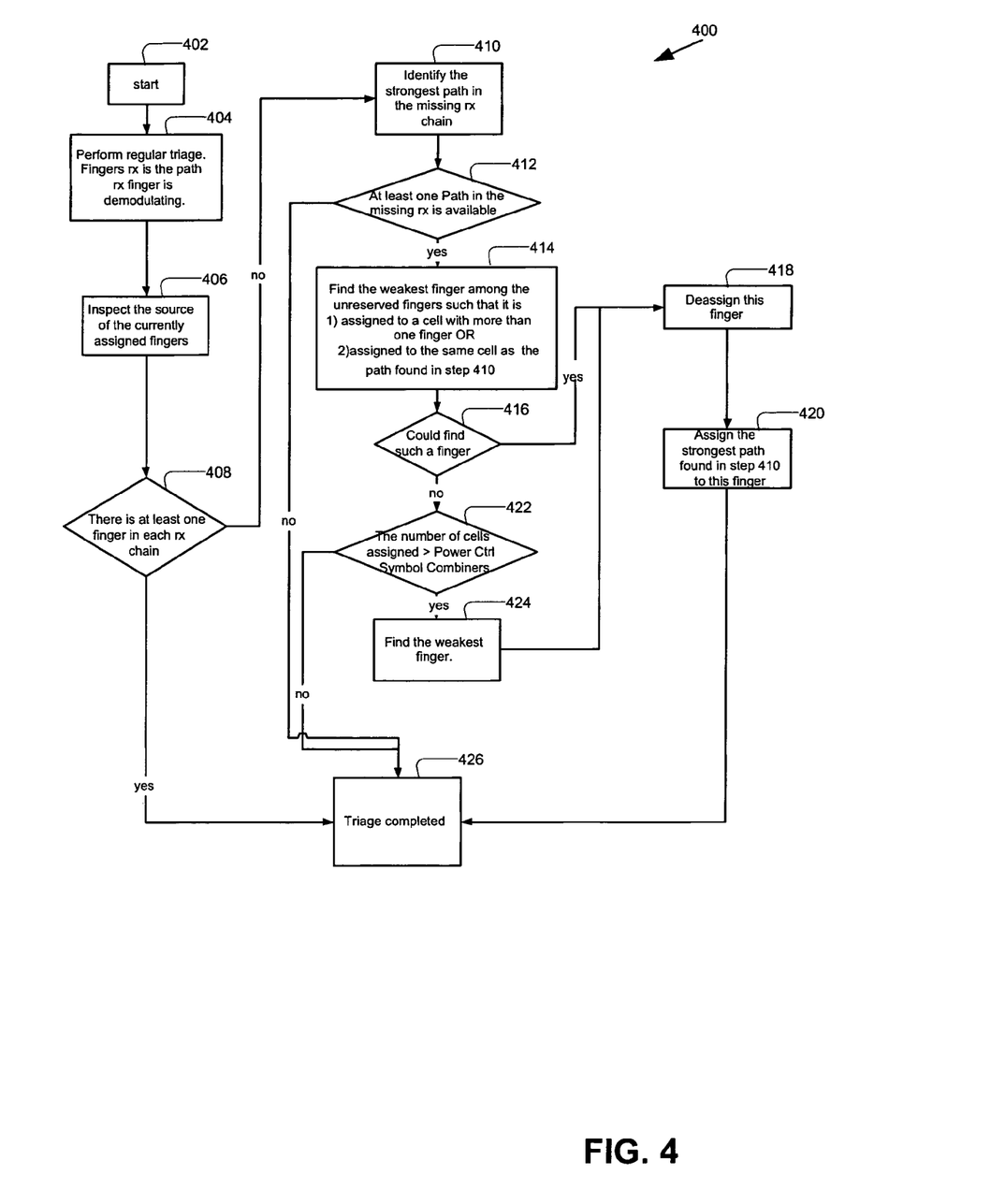
FIG. 4 is a flowchart illustrating steps of diversity optimization triage for assigning paths to demodulator fingers.

FIG. 4 is a flowchart illustrating steps of a diversity optimization algorithm for triage assignment of possible paths created by the searcher operation to demodulator fingers. One skilled in the art will understand that ordering of steps illustrated in FIG. 4 is not limiting. The method is readily amended by omission or re-ordering of the steps illustrated without departing from the scope of the disclosed embodiments. The diversity optimization algorithm maximizes the reception of the diversity receiver by emphasizing the diversity of the receive chains. Emphasizing the diversity of the receive chains enhances reception by better interference cancellation resulting from exploitation of the independent fading that is provided by multiple receive chains. The diversity of the receive chains is emphasized by ensuring receive chain diversity and cell diversity in signal combining. At least one demodulator finger is assigned to each receive chain without compromising cell diversity. In an exemplary embodiment having three cells with four paths each received by two antennas, four paths are chosen from the set of twenty-four possible paths to be assigned to four available demodulator fingers. If the four paths with highest signal energy are all from one cell, the weakest path is replaced with the highest energy path from another cell until all cells are represented. Likewise, if all paths are from a single antenna, paths will be replaced with paths received by any un-represented antenna until diversity optimization is achieved. In receiver architectures where the number of cells is greater than the number of power control combiners, cell diversity may be preserved to the number of power control combiners.

The diversity optimization algorithm 400 begins at step 402. Control flow proceeds to step 404.

In step 404, a standard finger assignment is made according to signal strength and cell diversity. If all of the cells in the active set are not represented in the assignment, the weakest signal path from a cell with multiple finger assignments is de-assigned and replaced with the strongest signal path of an un-represented cell until cell diversity is achieved. In the exemplary embodiment, four signal paths are assigned to four demodulator fingers. Control flow proceeds to step 406.

In step 406, the standard assignment of step 404 is inspected for receive chain diversity. Control flow proceeds to step 408.

In step 408, if all diversity receive chains were found to be represented by the demodulator finger assignment of step 406, both cell diversity from step 404 and receive chain diversity have been achieved. Control flow proceeds to step 426, ending the process. Otherwise, receive chain diversity has not been achieved and control flow proceeds to step 410 in order to ensure receive chain diversity.

In step 410, the strongest signal path received by the un-represented receive chain is identified from the set of possible paths. Control flow proceeds to step 412.

In step 412, the signal paths from the un-represented receive chain are inspected to determine whether at least one of the paths has sufficient signal strength for demodulation. If no signal of sufficient strength is present, control flow proceeds to step 426 ending the process. If a signal of sufficient strength is found, control flow proceeds to step 414.

In step 414, a demodulator finger is identified to be re-assigned with the strongest signal path of the un-represented receive chain identified in step 410 without disturbing the cell diversity of step 404. The finger having the weakest signal path that either originates from the same cell as the strongest signal path received by the un-represented receive chain identified in step 410, or a finger having a signal path originating from a cell having more than one demodulator finger assignment is identified for re-assignment. Control flow proceeds to step 416.

In step 416, if a demodulator finger for re-assignment was successfully identified, control flow proceeds to step 418. Otherwise, control flow proceeds to step 422.

In step 418, the signal path of the demodulator finger identified for re-assignment in step 414 is de-assigned. Control flow proceeds to step 420.

In step 420, the strongest signal path received by the un-represented receive chain identified in step 410 is assigned to the demodulator finger identified for re-assignment in step 414. Control flow proceeds to step 426 ending the process.

Control flow reaches step 422 if, in step 416, a demodulator finger could not successfully be identified for re-assignment without disturbing the cell diversity of step 404. Step 422 determines whether the number of cells assigned to demodulator fingers is greater than the number of power control combiners provided by the diversity receiver architecture.

In a CDMA communications system, all of the base stations in communication with a mobile unit send Up/Down power command to the mobile station. The mobile station employs OR of down power control logic, reducing transmit power, if any, one of the base stations command reduced power. In order to process the power control commands, the mobile station must have a demodulator finger assigned to the commanding base station and a power control combiner to process the power control command signals. In an exemplary embodiment, a receiver architecture supports three power control combiners and four demodulator fingers. In such an embodiment of receiver architecture, the cell diversity can only be preserved to three cells. In other words, the cell diversity is limited by the number of power control combiners the architecture supports because there is no purpose in preserving cell diversity to more than the number of available power control combiners. If all the four demodulator fingers are assigned signal paths from different cells, one must be eliminated because power control commands cannot be combined from all four cells with only three power control combiners.

If the number of assigned cells is not greater than the number of power control combiners, control flow proceeds to step 426 ending the process. If the number of assigned cells is greater than the number of power control combiners, control flow proceeds to step 424.

In step 424, the weakest signal assigned to a demodulator finger is identified and control flow proceeds to step 418 where the signal path is de-assigned.

Figure 5:
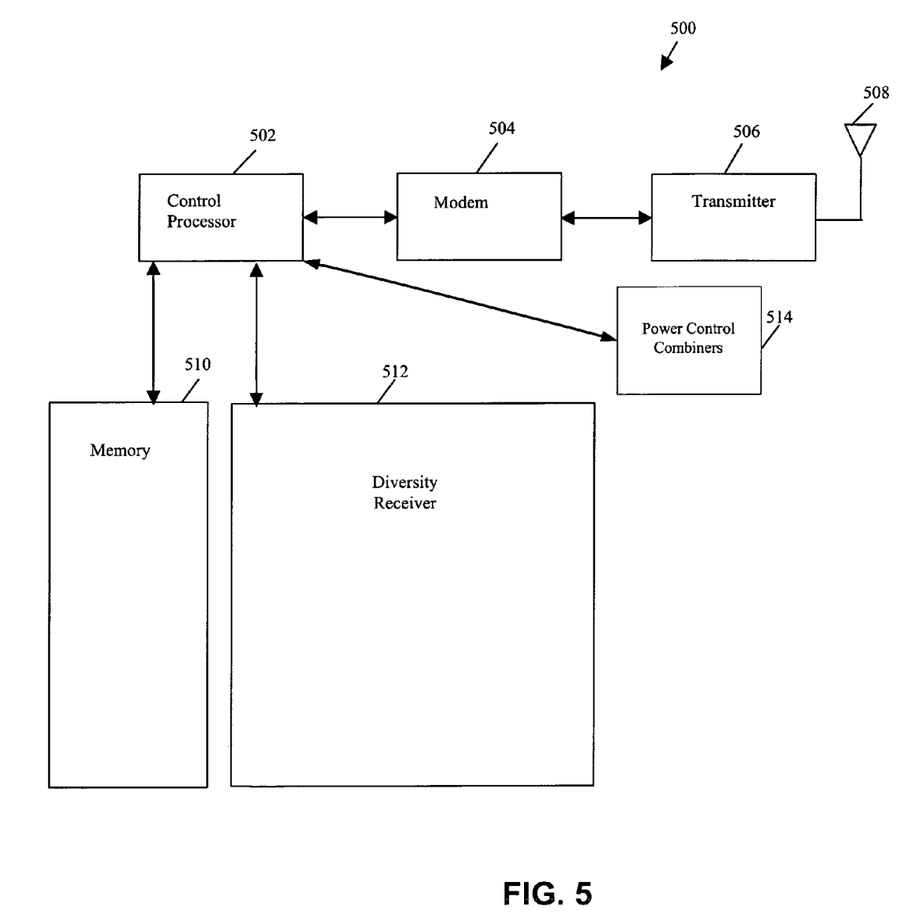
FIG. 5 is a diagram of an exemplary receiver apparatus capable of maximizing reception of multi-path signals by emphasizing the diversity of receive chains using optimal search and demodulator finger assignment operations for diversity receivers.

FIG. 5 is a diagram of an exemplary receiver apparatus 500 capable of maximizing reception of multi-path signals by emphasizing the diversity of receive chains using optimal search and demodulator finger assignment operations for diversity receivers. A control processor 502 establishes a wireless connection through a wireless modem 504, transmitter 506, and antenna 508 as shown. In an exemplary embodiment, the wireless modem 504 and transmitter 506 operate in accordance with the cdma2000 specification. Alternatively, the wireless modem 504 and transmitter 506 could operate in accordance with other wireless standards such as IS-95, W-CDMA, or EDGE.

The control processor 502 is connected to diversity receiver 512 and a memory 510 having code or instructions directing the control processor 502 to maximize reception of multi-path signals by emphasizing the diversity of receive chains using optimal search and demodulator finger assignment operations for diversity receivers. The memory 510 may include RAM memory, flash memory, ROM memory, EPROM memory, EEPROM memory, registers, hard disk, a removable disk, a CD-ROM, or any other form of storage medium or computer readable media known in the art.

In an exemplary embodiment, the control processor 502 executes instructions stored in memory 510 according to the steps of FIG. 4 to make a demodulator finger assignment according to signal strength and cell diversity. The control processor 502 then executes instructions stored in memory 510 to re-assign signal paths to achieve receive chain diversity if necessary. Control processor 502 may execute instructions stored in memory 510 to consider the availability of power control combiners 514 when making demodulator finger assignments depending on the architecture of diversity receiver 512.

Thus, a novel and improved method and apparatus for diversity searching and demodulator finger assignment in a wireless communication system have been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a receiver unit. In the alternative, the processor and the storage medium may reside as discrete components in a user terminal.

It should be understood that the disclosed embodiments described in the context of CDMA phones are applicable to other types of communications systems and modulation techniques, such as Personal Communications Systems (PCS), wireless local loop (WLL), private branch exchange (PBX), or other known systems. Furthermore, systems utilizing other well known transmission modulation schemes such as TDMA and FDMA as well as other spread spectrum systems may employ the disclosed embodiments.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for demodulator finger assignment in a diversity receiver, the method comprising:
    searching for signals sent by multiple cells received by multiple antennas of a diversity receiver to produce a set of possible multi-path signals for assignment to a plurality of demodulator fingers, wherein a number of possible multi-path signals is greater than a number of demodulator fingers of the diversity receiver;
    assigning at least one multi-path signal received from each cell to a demodulator finger; and
    assigning at least one multi-path signal received by each antenna to a demodulator finger.

2. The method of claim 1, wherein searching for signals comprises measuring correlation between received signals and pseudo-random noise (PN) sequences of the cells.

3. A diversity receiver device comprising:
    a plurality of antennas, each antenna being configured to receive signals from multiple cells;
    a plurality of receive signal pre-processors, each pre-processor coupled to a separate antenna; and
    a receive data processor configured to:
    search for signals sent by multiple cells received by the plurality of antennas to produce a set of possible multi-path signals for assignment to a plurality of demodulator fingers, wherein a number of possible multi-path signals is greater than a number of demodulator fingers;
    assign at least one multi-path signal received from each cell to a demodulator finger; and
    assign at least one multi-path signal received by each antenna to a demodulator finger.

4. The receiver device of claim 3 wherein the device is a mobile station.

5. A method for using a diversity receiver, the method comprising:
    searching for signals sent by multiple cells received by each of a plurality of antennas of a diversity receiver to produce a set of possible multi-path signals for assignment to a plurality of demodulator fingers, wherein a number of possible multi-path signals is greater than a number of demodulator fingers;
    assigning strongest multi-path signals from the set of possible multi-path signals to the demodulator fingers;
    de-assigning a weakest signal path received from a cell having multiple demodulator finger assignments and replacing the de-assigned signal with a strongest multi-path signal received from a cell having no demodulator finger assignment until all cells represented in the set of possible multi-path signals have at least one multi-path signal assigned to a demodulator finger;
    de-assigning a weakest signal path received by one of the plurality of antennas having multiple demodulator finger assignments and replacing the de-assigned signal with a strongest multi-path signal received by an antenna having no demodulator finger assignment until all antennas represented in the set of possible multi-path signals have at least one multi-path signal assigned to a demodulator finger; and
    combining the multi-path signals assigned to the demodulator fingers to produce a maximized received signal.

6. A diversity receiver device comprising:
    a plurality of antennas, each antenna being configured to receive signals from multiple cells;
    a plurality of receive signal pre-processors, each pre-processor coupled to a separate antenna; and
    a receive data processor configured to:
    search for signals sent by multiple cells received by each of the plurality of antennas to produce a set of possible multi-path signals for assignment to a plurality of demodulator fingers, wherein a number of possible multi-path signals is greater than a number of demodulator fingers;
    assign strongest multi-path signals from the set of possible multi-path signals to the demodulator fingers;
    de-assign a weakest signal path received from a cell having multiple demodulator finger assignments and replacing the de-assigned signal with a strongest multi-path signal received from a cell having no demodulator finger assignment until all cells represented in the set of possible multi-path signals have at least one multi-path signal assigned to a demodulator finger;
    de-assign a weakest signal path received by one of the plurality of antennas having multiple demodulator finger assignments and replacing the de-assigned signal with a strongest multi-path signal received by an antenna having no demodulator finger assignment until all antennas represented in the set of possible multi-path signals have at least one multi-path signal assigned to a demodulator finger; and
    combine the multi-path signals assigned to the demodulator fingers to produce a maximized received signal.

7. The receiver device of claim 6 wherein the device is a mobile station.

8. A mobile station comprising:
    a modem, a transmitter, and an antenna for establishing a wireless connection to a wireless network;
    a diversity receiver for acquiring a plurality of multi-path signals for assignment to a plurality of demodulator fingers;
    a control processor; and
    a memory coupled to the control processor having code or instructions for directing the control processor to make demodulator finger assignments according to signal strength, cell diversity and receive chain diversity.

9. A method comprising:
    finding multi-path signals sent by a plurality of cells received by a plurality of antennas of a diversity receiver, a number of found multi-path signals being greater than a number of demodulator fingers in the diversity receiver;

assigning strongest multi-path signals to the demodulator fingers;

if a first cell does not have at least one multi-path signal assigned to a demodulator finger, de-assigning a weakest signal path received from a second cell having multiple demodulator finger assignments;

replacing the de-assigned signal with a strongest multi-path signal received from the first cell; if an antenna does not have a multi-path signal assigned to a demodulator finger, de-assigning at least one of (a) a weakest signal path that originates from a same cell as a strongest signal path received by the un-assigned antenna, and (b) a signal path originating from a cell having more than one demodulator finger assignment such that each antenna has at least one multi-path signal assigned to a demodulator finger; and replacing the de-assigned signal with a strongest multi-path signal received by the un-assigned antenna.

10. The method of claim 9, further comprising determining whether a number of cells having multi-path signals assigned to the demodulator fingers is greater than a number of power control combiners.

11. The method of claim 10, wherein if the number of cells having multi-path signals assigned to the demodulator fingers is greater than the number of power control combiners in the diversity receiver, the method further comprises de-assigning a weakest signal assigned to a demodulator finger.

12. An apparatus comprising:
a plurality of antennas;
a plurality of demodulator fingers;
a processor; and
a memory, wherein the processor is configured to execute a set of instructions stored in memory to:
find multi-path signals sent by a plurality of cells received by the plurality of antennas, a number of found multi-path signals being greater than a number of demodulator fingers;
assign strongest multi-path signals to the demodulator fingers;
if a first cell does not have at least one multi-path signal assigned to a demodulator finger, de-assign a weakest signal path received from a second cell having multiple demodulator finger assignments;
replace the de-assigned signal with a strongest multi-path signal received from the first cell;
if an antenna does not have a multi-path signal assigned to a demodulator finger, de-assign at least one of (a) a weakest signal path that originates from a same cell as a strongest signal path received by the un-assigned antenna, and (b) a signal path originating from a cell having more than one demodulator finger assignment such that each antenna has at least one multi-path signal assigned to a demodulator finger; and
replace the de-assigned signal with a strongest multi-path signal received by the un-assigned antenna.

13. An apparatus comprising:
means for finding multi-path signals sent by a plurality of cells received by a plurality of antennas of a diversity receiver, a number of found multi-path signals being greater than a number of demodulator fingers in the diversity receiver;
means for assigning strongest multi-path signals to the demodulator fingers;
if a first cell does not have at least one multi-path signal assigned to a demodulator finger, means for de-assigning a weakest signal path received from a second cell having multiple demodulator finger assignments;
means for replacing the de-assigned signal with a strongest multi-path signal received from the first cell;
if an antenna does not have a multi-path signal assigned to a demodulator finger, means for de-assigning at least one of (a) a weakest signal path that originates from a same cell as a strongest signal path received by the un-assigned antenna, and (b) a signal path originating from a cell having more than one demodulator finger assignment such that each antenna has at least one multi-path signal assigned to a demodulator finger; and
means for replacing the de-assigned signal with a strongest multi-path signal received by the un-assigned antenna.

* * * * *